(No Model.)
J. J. GEIGER, Sr.
REGISTERING DEVICE FOR PHOTOGRAPHIC CAMERAS.
No. 487,262. Patented Dec. 6, 1892.
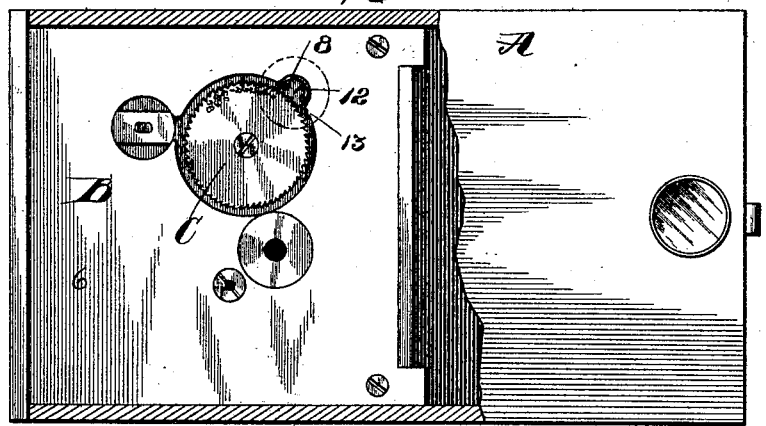
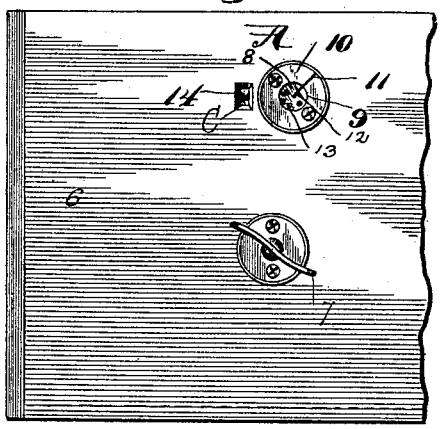
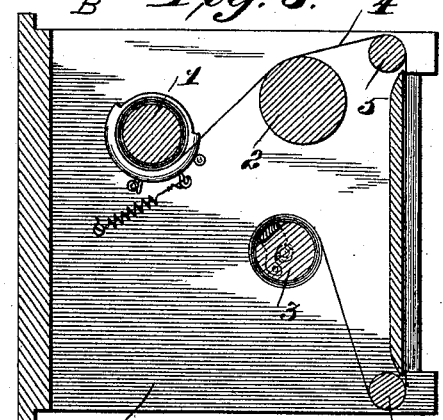
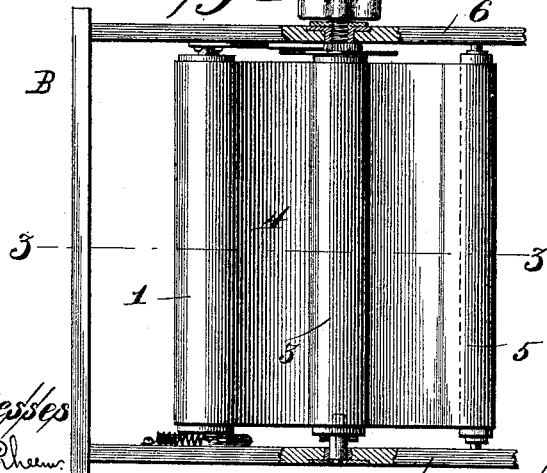
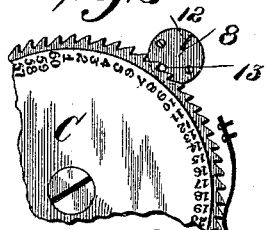
Witnesses
Inventor
John Jacob Geiger Sr.
By Lotz & Kennedy
Attys

UNITED STATES PATENT OFFICE.

JOHN JACOB GEIGER, SR., OF CHICAGO, ILLINOIS.

REGISTERING DEVICE FOR PHOTOGRAPHIC CAMERAS.

SPECIFICATION forming part of Letters Patent No. 487,262, dated December 6, 1892.

Application filed July 24, 1891. Serial No. 400,561. (No model.)

*To all whom it may concern:*

Be it known that I, JOHN JACOB GEIGER, Sr., a citizen of the United States, residing at Chicago, in the county of Cook and State of Illinois, have invented certain new and useful Improvements in Registering Devices for Photographic Cameras; and I do hereby declare the following to be a full, clear, and exact description of the invention, such as will enable others skilled in the art to which it appertains to make and use the same.

This invention relates to an improvement in registering devices for photographic cameras, and more particularly to that class of cameras in which a continuous sensitized film is employed.

The object of this invention is to provide means whereby a knowledge can be gained as to the number of exposures that have been made, and consequently the number of exposures that can yet be made before the number of exposures allotted to the continuous film have been employed.

The invention consists in the features of construction and combination of parts hereinafter fully described and specifically claimed.

In the accompanying drawings, illustrating my invention, Figure 1 is a plan view of a photographic camera constructed in accordance with my invention with certain parts cut away to show the interior construction. Fig. 2 is a plan view showing the parts in place that are cut away in Fig. 1. Fig. 3 is a sectional view on the line 3 3 of Fig. 4. Fig. 4 is a side elevation of the parts shown in Fig. 3. Fig. 5 is a detail fragmentary view, and Fig. 6 is a detail fragmentary view of the registering-wheel and means for operating the same.

This invention is especially applicable to that class of photographic cameras in which roll-holders are used.

In Fig. 1 the plan view of the entire apparatus is shown with the rear portion of the case A cut away and illustrates a novel construction of the roller-frame B. In Fig. 3 said roller-frame is shown in section, 1 indicating the supply or film roller, 2 the measuring-roller, and 3 the take-up roller. 4 indicates the continuous film, which is wound upon the supply-roller 1 and passes over the measuring-roller 2, over guide-rollers 5 5, and over the take-up roller 3.

All the rollers herein described are journaled or mounted in the side pieces 6 of the roller-frame, and the take-up roller 3 is provided with a thumb-piece 7, by means of which it can be turned to bring an unexposed section of the film in position after the foregoing section has been exposed. The trunnion or shaft upon which the measure-roller 2 turns is provided with a plate or disk 8 on the outside of the frame-piece 6 of the roller-frame.

An opening 9 is made in the casing A of the apparatus, which registers with the disk 8 when the frame is located within said casing, and the plate 10 is secured around said opening and is provided with a notch or mark 11. The measuring-roller is advanced to bring an unexposed portion of the film in position to be exposed, and the mark or notch 12 on the disk 8 indicates, therefore, by registering with the notch or mark 11 on the plate 10, as shown in Fig. 2, when the exposed portion of the film has been advanced and an unexposed portion is in position.

The continuous film can be made to contain any desired number of exposures; but the instrument illustrated is capable of sixty exposures, and it is plainly obvious that in the use of such a device the operator could not well keep an account of the number of exposures that he has made, and it is the object of this invention, as before stated, to provide a device for indicating the number of such exposures. In accordance, therefore, with my invention the top piece of the roller-frame is recessed to receive a rotatable disk C, that is provided with a notched periphery, and said notches are engaged by an eccentric-pin 13, carried by the disk 8, that turns with the measuring-roller 2. The notches in said disk C correspond with the number of exposures upon the film, and upon the said disk C are numbers running from "1" to "60."

The casing A of the apparatus is provided with a small opening 14, so located that when the frame is in place within said casing said opening 14 will register with the numbers upon said disk C.

The operation will be plainly obvious. When the film is advanced by means of a thumb-piece 7, the measuring-roller will be turned and the pin 13, carried by the disk 8 on the end thereof, will engage the notch or tooth of the disk C for each rotation of the measuring-roller and will move said disk to an extent to bring the next number in its series below the opening 14 in the casing. For instance, in Fig. 2 the opening 14 shows the figure "10," which indicates that three exposures have been made from the continuous film. When the thumb-piece is turned and the film advanced one section, the pin 13 on the disk 8 will engage another tooth on the disk C and move said disk to an extent to bring the numeral "11" below said opening 14, and so on.

I claim as my invention—

The combination, substantially as hereinbefore set forth, in a photographic camera, of the roller-frame, the supply and take-up rollers mounted in bearings in the sides of the same, a measuring-roller mounted, also, in bearings in said frame and over which the film passes and having its shaft passing through the side of the roller-frame, a plate or disk 8 on the end of said shaft outside of said roller-frame, provided with a mark or notch 12, an eccentric-pin 13 on said plate or disk 8, an opening 9 in the casing of the apparatus, located over said disk or plate 8 when the roller-frame is located within said casing and provided with a notch or mark 11, a revoluble disk C, located within a recess in said roller-frame and having a toothed edge located to be engaged by said eccentric-pin 13, a series of indicating characters arranged concentrically upon the side of said disk, and an opening in the casing of the apparatus, located over said indicating characters when the roller-frame is located within the said casing, substantially as described.

In testimony whereof I affix my signature in presence of two witnesses.

JOHN JACOB GEIGER, Sen.

Witnesses:
HARRY COBB KENNEDY,
OTTO LUEBKERT.